United States Patent
McNicol et al.

[11] Patent Number: 5,940,454
[45] Date of Patent: Aug. 17, 1999

[54] BLIND SWITCH DIVERSITY CONTROL APPARATUS

[75] Inventors: John Duncan McNicol, Kingswear; Edward Anthony Orchard, Totnes, both of United Kingdom

[73] Assignee: Nortel Networks Corporation, Ottawa, Canada

[21] Appl. No.: 08/992,029

[22] Filed: Dec. 17, 1997

[51] Int. Cl.$^6$ .................................................. H04B 7/10
[52] U.S. Cl. ........................................................... 375/347
[58] Field of Search .................................. 375/347, 349, 375/267, 277.1, 277.2; 455/132

[56] References Cited

U.S. PATENT DOCUMENTS

| | | | |
|---|---|---|---|
| 4,499,606 | 2/1985 | Rambo . | |
| 4,566,133 | 1/1986 | Rambo | 455/277.2 |
| 4,633,519 | 12/1986 | Goteh et al. . | |
| 5,313,660 | 5/1994 | Lindenmeier et al. | 455/135 |
| 5,355,010 | 10/1994 | Lindenmeier et al. | 348/706 |
| 5,561,673 | 10/1996 | Takai et al. | 371/5.5 |
| 5,634,204 | 5/1997 | Takahashi et al. . | |
| 5,818,543 | 10/1998 | Lee | 348/725 |

FOREIGN PATENT DOCUMENTS

| | | |
|---|---|---|
| 0457448A1 | 4/1991 | European Pat. Off. . |
| 0620657A1 | 4/1994 | European Pat. Off. . |
| 3006990 | 2/1980 | Germany . |
| 6-204925 | 7/1994 | Japan . |
| WO/86/05639 | 9/1986 | WIPO . |
| WO95/33312 | 7/1995 | WIPO . |

*Primary Examiner*—Temesghen Ghebretinsae
*Assistant Examiner*—Lenny Jiang
*Attorney, Agent, or Firm*—Ronald L. Yin; Limbach & Limbach LLP

[57] ABSTRACT

A receiver for receiving a radio signal carrying digitally-encoded data has a plurality of diversity antennas, respectively coupled to inputs of a selector. A received signal selected by the selector is equalized by an adaptive equalizer and then demodulated to recover data, when possible. A quality metric dependent on the quality of the recovered data is generated. A switch controller responsive to the quality metric controls the selector. After the controller controls the selector to select a new antenna, it monitors the quality metric as the adaptive equalizer retrains and, if the quality metric does not exceed a predetermined threshold before a predetermined forward guard time expires, the controller causes the selector to select another antenna. The switch controller may also receive a signal level signal dependent on the level of the received signal. After the controller controls the selector to select a new antenna, if the level of the received signal is less than a predetermined threshold the demodulator recovers data, if possible, for a short, predetermined time and, if the quality metric derived therefrom does not exceed a predetermined threshold, the controller controls the selector to select another antenna after the short, predetermined time.

46 Claims, 6 Drawing Sheets

BLIND SWITCH DIVERSITY CONTROL APPARATUS

BACKGROUND OF THE INVENTION

1. Field of the Invention

This invention relates to a method and apparatus for receiving a radio signal, in which blind-switching-diversity may be implemented in a receiver of digitally-encoded data, such as time division multiplexed/time division multiple access (TDM/TDMA) data. The invention finds particular application in the field of fixed wireless access (FWA).

2. Description of the Prior Art

In wireless TDM/TDMA communications networks, message data are transmitted in channels comprising predetermined time slots within a series of fixed-length frames. Each frame or slot contains a synchronization (or sync) word comprising a sequence of predetermined sync symbols. Sync words are used by a receiver for timing and carrier (phase and frequency) synchronization. This includes equalizer training, which is the process of adapting the filter coefficients (or tap weights) of an equalizer so as to adjust its phase and/or frequency response to compensate as far as possible for multipath interference or channel distortion in the wireless transmission.

Other receiver functions can also be trained using sync words, such as carrier phase recovery, time slot recovery and/or automatic gain control.

In a conventional TDM/TDMA receiver, each slot carrying a sync word and data is demodulated starting with the sync word, so that the equalizer and any other relevant functions may be trained before recovery of the received data. This is to reduce the occurrence of errors in data recovery.

The time taken to train an adaptive equalizer, or other receiver function, depends on the lengths of the sync words and on the complexity and effectiveness of the method used to adapt the filter coefficients when a sync word is received. However, if the sync word is too short it may not be possible to train the equalizer fully using only one sync word. It is then necessary to train the equalizer iteratively, using the sync words in a series of slots or frames. Of course training may then take a significant time and data received in early frames may not be recovered accurately. In fact, until the equalizer is trained it is likely to be impossible to recover data at all. This condition of the receiver may be termed a closed-eye pattern.

It is possible to ensure rapid training, often even within one slot, by using longer sync words. This provides rapid training but disadvantageously reduces the amount of message data which can be carried in each slot.

The balance between providing sync words of adequate length and maximizing the data capacity of each slot depends significantly on the type of communications network involved. For example in a mobile communications network, such as a cellular mobile telephone network, multipath interference and other channel distortion may be severe and, significantly, may change very fast. This means that a TDM/TDMA transmission for mobile communications must contain sufficiently long, sufficiently frequent, sync words to allow equalizer training during reception of the transmission in order to compensate for rapid channel-distortion variation. For example, if channel distortion changes significantly between the slots of a channel in two consecutive frames, then unless the equalizer can retrain sufficiently using the sync word at the start of the slot in the second frame, it may not be possible to recover the data in the second frame. However, the presence of a long sync word in every slot is a system overhead which can significantly reduce useful message data capacity.

One way to reduce sync word overhead in some systems is to use a longer sync word in a pilot frame or slot at the beginning of a new transmission, to allow rapid equalizer training when the transmission is set up, and shorter sync words in subsequent frames. Nevertheless, the sync words in subsequent frames in mobile communications systems must still be long enough to allow rapid training during reception of the transmission.

In fixed wireless access (FWA) communications, radio signals are transmitted between a fixed base station and fixed subscriber units. For example, a FWA link may form part of a telephone system replacing the local link between an exchange and each subscriber's home or business. Therefore, in a FWA link, channel distortion varies much more slowly than in mobile communications.

Channel distortion may still vary during a transmission, so equalizer training during the transmission is still required, but it is much less likely that the channel distortion may change enough during a single frame to prevent accurate reception of data in the following frame.

Therefore, in a FWA system shorter sync words than those needed in a mobile system can provide sufficient retraining between frames to maintain good reception. Using shorter sync words also advantageously reduces the system overhead and can significantly increase the amount of useful message data which can be carried.

Certain problems arise, however, from the use of short sync words. For example, when a communication is newly set up, if short sync words are used it may take several frames for the receiver equalizer to train fully to the new transmission and so data may be lost at the beginning of the transmission. Starting each new transmission with a pilot frame or slot carrying a longer sync word can alleviate this problem.

A problem also arises in implementing diversity reception, in which performance is enhanced by using two or more receiving antennas. A low complexity form of diversity is blind switching, in which a switch to a new antenna is made if the signal quality derived from, or the signal level received by, a presently-used antenna becomes unacceptable, but in which the signal quality or signal level from the new antenna is not known before switching. The signal quality or signal level from the new antenna is only known after switching.

Blind switching diversity is an effective means of providing the advantages of diversity at low cost, as only a single set of receiver circuitry is needed. There is no requirement to monitor signals received by the new antenna before switching. However, when a switch is made to a new antenna with no prior knowledge of the signal quality receivable by that antenna, there is a risk that it will be worse than the signal quality from the previously-connected, or old, antenna. If this happens, then a decision to switch back to the old antenna or, if available, to another new antenna, must be made as quickly as possible.

When a switch to a new antenna is made, the channel distortion is usually different from that of the old antenna, so the equalizer (and any other relevant components of the receiver) must retrain to compensate for the new channel distortion.

This retraining causes no difficulty in a mobile communications system which uses sufficiently long sync words to allow rapid retraining at any time during a transmission. If a blind switch is made to a new antenna in a mobile system, the receiver can typically retrain within one slot or frame. It can therefore recover data immediately from the new signal and assess its quality without delay, allowing a rapid decision to be made to switch back to the old antenna if the signal quality from the new antenna is insufficient. Even if the signal quality from the new antenna is so poor that data from the signal cannot be decoded, no more than a single frame (or slot) of data need be lost, which usually causes only an insignificant interruption in communication. Consequently, blind switching diversity in mobile communications receivers is well known.

By contrast, if blind switching diversity is considered for a FWA system using short sync words to optimise data capacity, retraining to the signal received by a new antenna after a blind switch during a transmission may take several frames. A significant delay would then be expected before data could be recovered, the quality of the data evaluated and a decision made whether or not to switch again to the old antenna or to another new antenna. Such a delay could disadvantageously cause a significant interruption in communications.

Nevertheless, diversity reception in FWA systems is desirable because, although channel fading occurs relatively slowly, if a channel does fade sufficiently that message data is lost then it may take a long time for the channel distortion to change so that communication can be resumed.

SUMMARY OF THE INVENTION

Accordingly, it is an object of the present invention to provide a method and an apparatus for implementing blind switching diversity in a radio communications system using short sync words, and so to allow signal transmission at lower power without reducing data reception quality.

It is a further object of the invention to provide a method and an apparatus for handling a blind antenna switch in a system having a significant receiver retraining time.

A still further object of the invention is to provide a method and apparatus for implementing blind switching diversity in a FWA TDM/TDMA communications system.

The invention, in various aspects, is defined in the independent claims appendent hereto. Preferred or advantageous features of the invention are defined in dependent subclaims.

A first aspect of the invention relates to a receiver for receiving a radio signal carrying digitally-encoded data. The receiver has a plurality of antennas, each coupled to a respective input of a selector. The selector directs a received signal from a selected antenna to the remainder of the receiver. The received signal is equalized by an equalizer and then demodulated to recover the data, when possible. A quality metric dependent on the quality of the recovered data is generated. A switch controller responsive to the quality metric controls the switching of the selector as follows. After the controller controls the selector to select a new antenna, the controller monitors the quality metric while the equalizer retrains and, if the quality metric does not exceed a predetermined threshold before a predetermined forward guard time expires, the controller controls the selector to select another antenna.

In its first aspect, the invention also provides a corresponding method for receiving a radio signal.

The invention in its first aspect may thus advantageously enable a blind switch to a new antenna providing diversity reception even in a radio communications system using short sync words and having a significant receiver retraining time. This is achieved by allowing time after a blind switch to retrain the receiver but limiting that time to prevent a closed eye pattern persisting for an unacceptable time.

A second aspect of the invention relates to a receiver in which the switch controller receives a signal level signal dependent on the level of the received signal. After the controller controls the selector to select a new antenna, if the level of the received signal is less than a predetermined threshold, then the demodulator recovers data, if possible, for a predetermined short time and, if the quality metric derived therefrom does not exceed a predetermined threshold, the controller controls the selector to select another antenna. If the received signal is a framed data signal, the predetermined short time may be a small predetermined number of frames, such as one, two or three frames.

In its second aspect, the invention also provides a corresponding method for receiving a radio signal.

The invention in its second aspect may thus advantageously enable a blind switch to a new antenna providing diversity reception even if the signal level of the signal received by the new antenna is low. Under such circumstances, depending on the channel distortion of the new antenna, it may still be possible to recover acceptable data. If the signal level is low, the invention permits data recovery initially only for a short time after a blind switch, and deems the blind switch successful despite the low signal level if the quality of that recovered data is acceptable.

An alternative view of the second aspect of the invention is as follows. When a blind switch to a new antenna is made, if the signal level of the signal received by the new antenna is low, there is only a small probability that satisfactory data can be recovered from that signal. The second aspect of the invention allows the new antenna to be rejected as soon as possible under such circumstances, after only a brief assessment as to whether satisfactory data can be recovered, to avoid dwelling on an antenna which has only a low probability of achieving satisfactory reception.

The first and second aspects of the invention may advantageously be combined in a signal receiver or method, the first aspect applying if the signal level after a blind switch is high and the second aspect applying if the signal level is low.

These aspects of the invention may even be combined more closely it the forward guard time is varied as a function of the signal level after a blind switch. In a framed radio communications system, the minimum forward guard time would be one frame.

A third aspect the invention relates to an apparatus for upgrading an existing receiver for receiving a radio signal carrying digitally-encoded synchronization words and data, to implement blind-switching-diversity reception. The receiver comprises an antenna for receiving the radio signal, an equalizer for equalizing the received signal and a demodulator for recovering the data. The upgrading apparatus comprises one or more additional antennas or two or more replacement antennas, a selector for selecting an antenna to receive the radio signal, a means for generating a quality metric dependent on the quality of the recovered data and a controller responsive to the quality metric for controlling the selector.

In the upgraded receiver, after the controller controls the selector to select a new antenna, the equalizer uses one or more sync words to retrain on the received signal is from the new antenna and, if the quality metric does not equal or exceed a predetermined threshold value before a predetermined forward guard time has ended, the controller causes the selector to select another antenna when the forward guard time has ended.

A fourth aspect of the invention relates to an apparatus for upgrading an existing receiver for receiving a radio signal carrying digitally-encoded synchronization words and data, to implement blind-switching-diversity reception. The receiver comprises an antenna for receiving the radio signal, an equalizer for equalizing the received signal and a demodulator for recovering the data. The upgrading apparatus comprises one or more additional antennas or two or more replacement antennas, a selector for selecting an antenna to receive the radio signal, a signal level detector for detecting a signal level of the received signal, a means for generating a quality metric dependent on the quality of the recovered data, and a controller responsive to the quality metric for controlling the selector.

In the upgraded receiver, after the controller controls the selector to select a new antenna, if the signal level is less than a signal-level threshold, then the demodulator recovers data for a predetermined short time and generates a quality metric, and if the quality metric is less than a predetermined threshold value, then the controller controls the selector to select another antenna to receive the radio signal. If the received signal is a framed data signal, the predetermined short time may be a predetermined small number of frames.

The third and fourth aspects may thus advantageously provide means to upgrade existing receivers cost-effectively to implement the first and second aspects of the invention.

In this description, the term "quality metric" is used and defined. However, in the context of the invention, this term may include any appropriate measure, metric or value of the quality, impairment, accuracy or error-rate or the like, of data recovered from a received signal. The invention encompasses the use of any such parameter as the basis for assessing the adequacy or acceptability of a received data signal.

DESCRIPTION OF THE PREFERRED EMBODIMENTS

Background to the Embodiments

Figure 1:
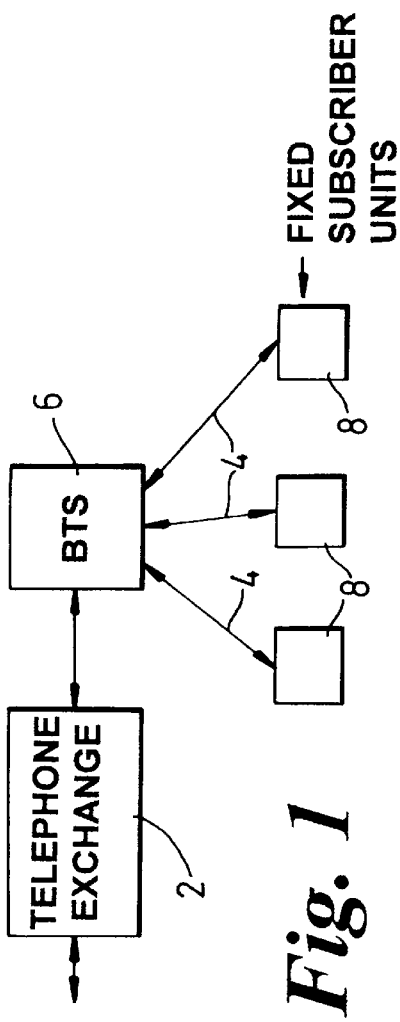
FIG. 1 is a block diagram of a FWA telephone system.

As shown in FIG. 1, the preferred system is part of a telephone system in which the local wired loop from the exchange 2 to each subscriber has been replaced by a full duplex radio link 4 (Air Interface) between a fixed base transceiver station (BTS) 6 and fixed subscriber unit 8.

The receiver described below as the preferred embodiment, and the described variants thereof, are preferably implemented as BTS receivers although similar receivers may be implemented as subscriber unit receivers.

There are similarities between the preferred system and digital cellular mobile telephone systems such as GSM which are known in the art. One difference compared with GSM is that, in the preferred system, subscriber units are at fixed locations and there is no need for hand-off arrangements or other features relating to mobility. This means that, for example, in the preferred system directional antennae and mains electricity can be used.

Many protocols are well-known for TDM/TDMA signalling between a BTS and subscriber units in a FWA system. The invention may be implemented with any suitable protocol, two of which are described herein with reference to FIGS. 2 and 3 respectively.

Figure 2:
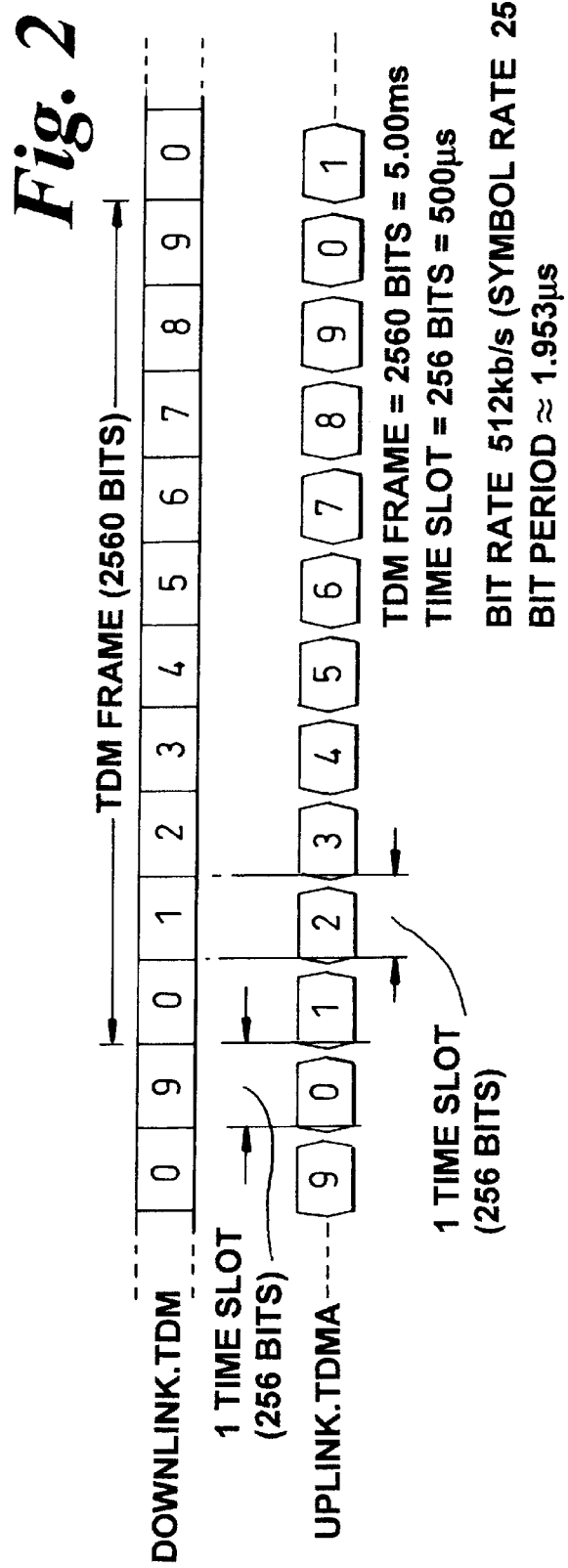
FIG. 2 is a diagram of the slots within a TDM frame and a TDMA frame for a first communications system.

The Nortel Proximity-I system (of Northern Telecom Limited, World Trade Center of Montreal, 380 St. Antoine Street West, 8th Floor, Montreal, Quebec H2Y 3Y4, Canada) provides six duplex radio links at twelve frequencies chosen from an overall frequency allocation, so as to minimize interference between base stations nearby. The frame structure and timing for each duplex link is illustrated in FIG. 2. Each duplex radio link comprises an up-link from a subscriber unit to a base station and, at a frequency offset, a down-link from the base station to the subscriber unit. The down-links are TDM, and the up-linked are TDMA. Modulation for all is $\pi/4-$ DQPSK (Differential Quadrature Phase Shift Keying), and the basic frame structure for all links is ten slots per frame of 2560 bits, i.e. 256 bits per slot. The bit rate is 512 kbps. Down-links are continuously transmitted and incorporate a broadcast channel for essential system information. When there is no user information to be transmitted, the down-link transmissions continue to use the basic frame and slot structure and contain a suitable fill pattern.

For both up-link and down-link transmissions, there are two types of slot: normal slots which are used after call set-up, and pilot slots used during call set-up.

Each down-link normal slot comprises 24 bits of synchronization information (a 24-bit sync word) followed by 24 bits designated S-field, which include an 8 bit header, followed by 160 bits designated D-field, which includes any message data. This is followed by 24 bits of Forward Error Correction and an 8 bit tail, followed by 12 bits of the broadcast channel. The broadcast channel consists of segments in each of the slots of a frame which together form the down-link common signalling channel which is transmitted by the base station, and contains control messages containing link information such as slot lists, multi-frame and super-frame information, connectionless messages, and other information basic to the operation of the system.

During call set-up, each down-link pilot slot contains frequency correction data and a long sync word, or training sequence, for receiver initialization including equalizer training, with only a short S-field and no D-field information.

Up-link slots basically contain one of two different types of data packet. The first type of packet, called a pilot packet, is used before a connection is set up, for example, for an ALOHA call request and to allow adaptive time alignment. The other type of data packet, called a normal packet, is used when a call has been established and is a larger data packet, due to the use of adaptive time alignment.

Each up-link normal packet contains a data packet of 244 bits which is preceded and followed by a ramp of 4 bits duration. The ramps and the remaining bits left of the 256 bit slot provide a guard gap against interference from neighbouring slots due to timing errors. Each subscriber unit adjusts the timing of its slot transmissions to compensate for the time it takes signals to reach the base station. Each up-link normal data packet comprises a 24 bit sync word followed by an S-field and D-field of the same number of bits as in each down-link normal slot.

Each up-link pilot slot contains a pilot data packet which is 192 bits long preceded and followed by 4 bit ramps defining an extended guard gap of 60 bits. This larger guard gap is necessary because there is no timing information available and without it the propagation delays would cause neighboring slots to interfere. The pilot packet comprises a longer, 64 bit sync word followed by 104 bits of S-field which starts with an 8 bit header and finishes with a 16 bit Cyclic Redundancy Check, 2 reserved bits, 14 FEC bits, and 8 tail bits. There is no D-field.

In the case of normal telephony, on both the up-link and down-link, the D-field is the largest data field and contains digitised speech samples, but can also contain non-speech message data samples. Thus, the D-field is dramatically increased in size compared with the pilot slot, because a much shorter sync word is carried in slots during a transmission.

Further details of the Nortel Proximity-I system are described in a paper presented at the Local Loop Fixed Radio Access meeting, at Savoy Place, London, UK on Friday Dec. 1, 1995 entitled "Ionica Fixed Radio Access Systems" by Jeffrey Searle et al. The paper is incorporated herein by reference.

Figure 3:
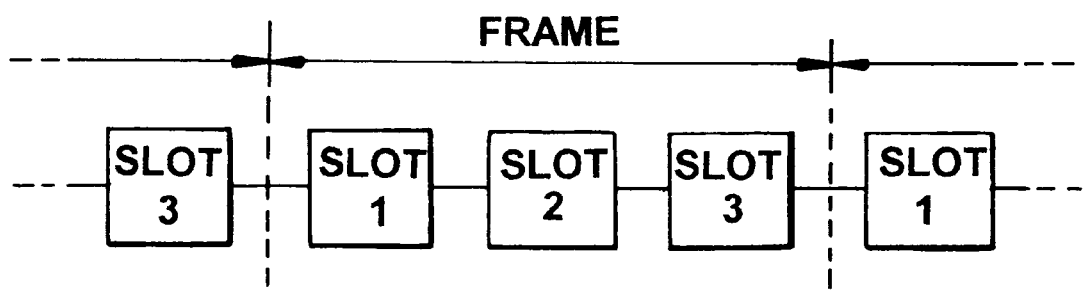
FIG. 3 is a more detailed diagram of the structure of a TDMA frame for a second communications system.

A second well-known TDM/TDMA signalling protocol is the North American Cellular TDM Standard, known as IS-136. IS-136 is fully digital and is similar to IS-54, which is backwards-compatible with certain analog systems, using an analog broadcast channel. In these systems, each frame contains three slots, each for carrying information to or from a different subscriber. Again, the downlink is TDM and the uplink is TDMA. This is illustrated in FIG. 3, in which slots 1, 2 and 3 carry signals and data to or from three respective subscribers.

A Prior Art Receiver

Figure 4:
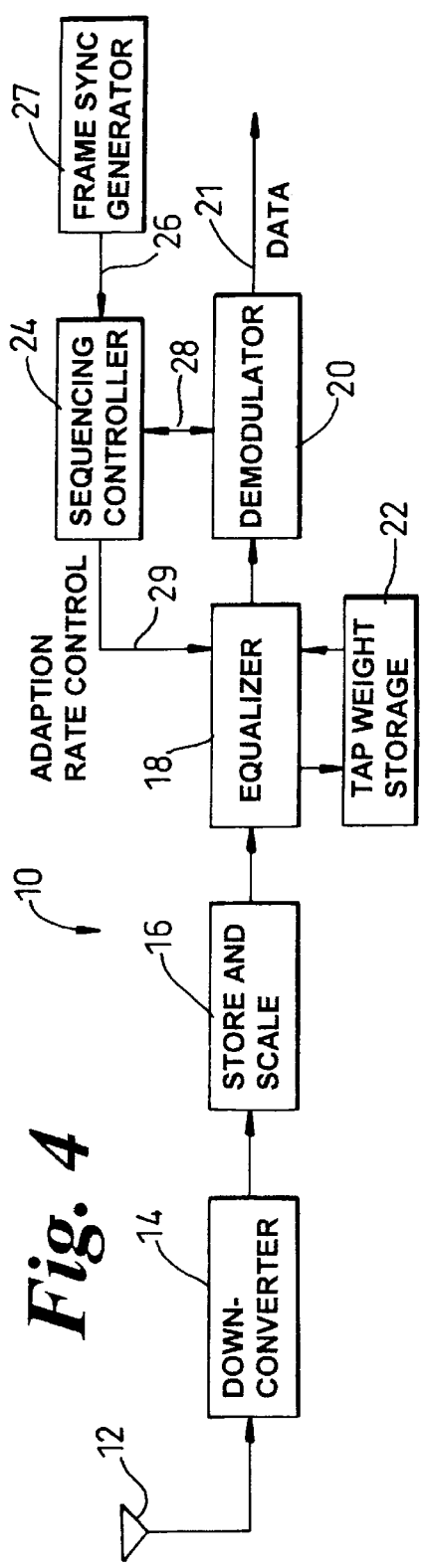
FIG. 4 is a block diagram of a prior art FWA receiver.

FIG. 4 is a block diagram of the principal elements of a conventional BTS FWA Proximity-I receiver. The signals from each subscriber are carried in a predetermined slot within each frame, as described above.

In the receiver 10 in FIG. 4 a radio frequency (RF) TDMA signal is received by an antenna 12 and down-converted in known manner to a lower frequency by a down-converter 14. The down-converted signal is then input to a store-and-scale circuit 16 which stores signal samples and scales the signal. In the Proximity-I system, the RF signal has a frequency of 3400 to 3500 MHZ and the down-converted signal has a frequency of about 900 MHZ. The down-conversion may be carried out in more than one step if required. The scaled signal is input to an equalizer 18 which equalizes the signal to compensate for time delay spread and/or frequency dispersion resulting from channel distortion of the signal received by the antenna. The equalized signal is input to a demodulator 20 which recovers and outputs message data from the signal. Further handling of the data depends on the nature of the data, such as voice or other data, and the nature of the communication. Usually, however, the uplink message data received at the BTS is rerouted in known manner to another subscriber, to whom the data is addressed.

The operation of the equalizer 18 is controlled by filter coefficients, or tap weights, which are stored in a tap weight store 22 connected to the equalizer. Each TDM/TDMA transmission carries sync words, usually one in each slot, for training the equalizer so as to compensate for the channel distortion. Since each slot in an uplink frame may be transmitted by a different subscriber and the radio link, or air interface, between each subscriber and the BTS is likely to be different, different tap weights will usually be required at the BTS for each slot in each frame. These tap weights are stored in the tap-weight store.

Equalizer training is controlled by a sequencing controller 24 which receives a frame sync signal 26 from a frame synchronization signal generator 27 and timing information 28 from the demodulator 20, and outputs an adaption rate control signal 29 to the equalizer. Line 28 carries nominal frame (slot) timing from the sequencing controller 24 to the demodulator 20 and a sync word correlation magnitude signal from the demodulator 20 to the sequencing controller 24. The sync word correlation magnitude signal is used by the sequencing controller to detect a pilot sync word, in order to determine that a new call has started, and to detect when the transition from pilot packet transmission to normal packet transmission occurs. The equalizer is thus controlled in known manner to adapt the tap weights quickly during the reception of sync words and more slowly during the reception of message and other data.

When a new link between a subscriber and the base station is set up, for example if the subscriber makes or receives a telephone call, various handshake procedures are carried out to set up the link in known manner.

When the first slot of an uplink transmission is received, the equalizer must train, or retrain, to compensate for the channel distortion of the new channel. A pilot slot having a long sync word is preferably used to allow rapid training at the start of the transmission. During the transmission, the tap weights for the channel are frozen, or stored, at the end of each slot from the subscriber for use at the beginning of the next. Each slot of the transmission contains a short sync word and the tap weights are adapted during each slot to compensate for changes in channel distortion during the transmission. In an FWA application such changes are usually relatively slow and only limited retraining is required during each slot.

First Embodiment and Best Mode of the Invention

Figure 5:
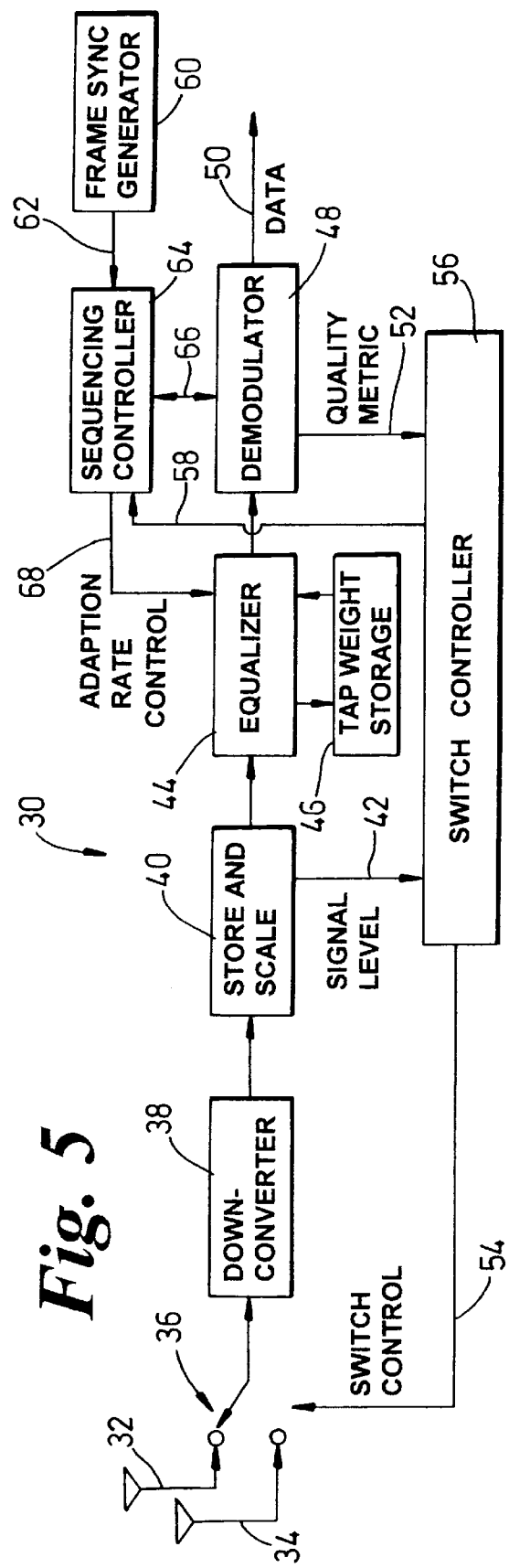
FIG. 5 is a block diagram of a receiver according to a first embodiment of the invention.

FIG. 5 shows a block diagram of a receiver 30 according to a first embodiment of the invention. This receiver is based on the receiver of FIG. 4, modified to implement blind-switching diversity.

The receiver 30 comprises two antennas 32, 34 coupled to two respective inputs of a selector, or selector switch 36. The selector switch output is coupled to an input of a down-converter 38, which has an output coupled to an input of a store-and-scale circuit 40. The store-and-scale circuit stores signal samples, scales the signal and generates a signal level signal 42. The store-and-scale circuit has an output, for outputting a scaled signal, coupled to an input of an equalizer 44, which is connected to a tap-weight store 46 for storing tap weights. The equalizer has an output coupled to an input of a demodulator, which recovers and outputs message data 50. The demodulator also generates a quality metric 52. A switch controller 56 has an output for sending switch control signals 54 to the selector switch 36 and receives the signal level signal 42 and the quality metric 52 at respective inputs. The switch controller can also output an adaption rate override signal 58 to a sequencing controller 64. The sequencing controller 64 receives at respective inputs the adaption rate override signal and a frame sync signal 62 from a frame synchronization signal generator 60, and is coupled to the demodulator 48 for the exchange of timing and control signals 66 including nominal frame (slot) timing signals and sync word correlation magnitude signals.

The sequencing controller outputs an adaption rate control signal 68 which is received at an input of the equalizer 44.

In the receiver 30 of FIG. 5 the two antennas 32, 34 are provided for receiving the TDMA uplink signal. The antennas may be of any type, as long as there is diversity between the signals they receive. For example, the antennas may be identical but physically separated, or they may be close to each other but arranged to receive different signal polarizations. In addition, the antennas may be omni-directional or sectored. However, diversity switching with omni-directional antennas suffers the possible disadvantage that some receivers (i.e. some subscribers, if the omni-directional antennas are at a BTS) will see the pair of diversity antennas one behind the other.

The antennas are coupled to two respective inputs of the selector, or selector switch, 36. The selector directs signals received by a selected one of the antennas to the down-converter 38 which converts the received signal in known manner to a lower frequency. The down-converted signal is input to the store-and-scale circuit 40 which stores signal samples and scales the signal. In addition, the store-and-scale circuit generates the signal level signal 42, which is indicative of the level of the received signal. The scaled signal is input to the equalizer 44 which equalizes the signal. The equalized signal is then demodulated by the demodulator 48 which recovers and outputs the message data 50 carried by the received signal. The demodulator also generates the quality metric, or impairment metric, 52 indicative of the quality of the demodulated signal. The nature of the quality metric is described in more detail below.

It should be noted that it may not always be possible for the demodulator to recover data, for example if the received signal is not adequate because of severe channel fading or distortion. References to the recovery of data by the demodulator should therefore be understood as including the qualification "recovery of data, when possible".

The selector switch 36 is controlled by the switch control signal 54 generated by the switch controller 56 which is responsive to the signal level signal 42 and the quality metric 52. The controller also provides the adaption rate override signal 58 to the sequencing controller 64.

The sequencing controller 64 controls the retraining of the equalizer 44 via the adaption rate control signal 66. During the normal reception of a signal from a selected antenna, the sequencing controller controls the adaption rate of the equalizer in the same way as described above in relation to the prior art receiver 10 of FIG. 4. Thus, tap weight adaption is more rapid during the reception of sync words and is slower during the reception of message data. In addition, however, the sequencing controller 64 receives the adaption rate override signal 58 from the switch controller 56. The function of this signal will be described below.

Preferably, a switch between antennas is made by switching the RF signals received by the antennas. Alternatively, the switch may be made at a lower frequency by down-converting the signal from each antenna upstream of the selector switch. It is easier to switch signals at lower frequencies but duplication of down-conversion circuitry upstream of the selector switch may increase the cost of the receiver.

The receiver at a BTS receives a TDMA signal in which different slots have been transmitted by different subscriber units at different locations. The channel distortion for each slot is likely to be different and so the receiver switch controller must decide which antenna to use for receiving each slot and control the selector switch accordingly. Antenna switches must therefore be timed to be made between slots so as to avoid loss of data.

When a framed signal is received, antenna switches should be timed to occur in the guard interval between frames so as to avoid loss of data. If a non-framed signal is received, blind-diversity antenna switching may still be useful, but data may be lost during antenna switches.

During reception of a transmission from a subscriber, the equalizer 44 of FIG. 5 functions in the same way as the equalizer 18 of FIG. 4 to compensate for channel distortion, and changes in channel distortion. Also in the same way, the equalizer tap weights are frozen, or stored, at the end of each slot from a subscriber for use at the beginning of the next slot from that subscriber, and the tap weights are adapted during each slot. In practice, "freezing" the tap weights includes the possibility that the tap weight adaption rate is slowed to a very slow rate rather than being stopped completely. This will depend on the particular implementation of adaption rate control in any particular receiver.

In the receiver of FIG. 5, the quality metric 52 derived from the slots received from each subscriber is monitored by the switch controller and, if the quality metric drops below a pre-determined threshold, the switch controller controls the selector switch 36 to switch to the other antenna to receive further slots from that subscriber. Since the antenna switch is blind, nothing is known about the channel distortion of the new antenna or the quality of signal it may receive before the switch is made. In addition, the channel distortion of the old antenna may not match the channel distortion of the new antenna and, since the transmission only contains a short sync word in each slot, it may take several frames after a blind switch to retrain the equalizer sufficiently to recover data from the signal received by the new antenna. It may be impossible to recover any data until the equalizer has retrained sufficiently. Advantageously, in a telephone system the audio signal may be squelched during this time.

The receiver of FIG. 5 therefore operates according to the following method to overcome this difficulty. The method is illustrated in the flow chart of FIG. 6.

If, during a transmission, the switch controller determines that the quality metric derived from the signal from the currently-connected antenna is less than a predetermined antenna-switching threshold (step 100), it controls the selector switch to select a new antenna (step 102).

In the frame following the antenna switch, the store-and-scale circuit 40 generates a signal level signal 42 indicating the signal level from the new antenna. The switch controller compares this signal level with the signal level preceding the antenna switch (step 104).

If the new signal level is less than the old signal level by more than a predetermined margin, the switch controller sends an adaption-rate-override signal 58 to the sequencing controller 64 to control the equalizer to freeze the existing tap weights (step 106) and not to begin retraining, while the demodulator demodulates the first slot (or a predetermined small number of slots or frames) after the switch (step 108). If the quality metric derived therefrom is acceptable (greater than the antenna-switching threshold) (step 110) then the switch controller decides that the switch to the new antenna has been successful and re-enables equalizer retraining in subsequent slots (step 116). If, however, the quality metric derived from the first slot is not acceptable, the switch controller controls the switch to revert for the next frame to the old antenna (step 112) and controls the equalizer (via the sequencing controller) to re-enable tap weight adaption. After switching back to the original antenna, the switch controller disables further antenna switching for a pre-selected time interval, termed a reverse guard time (step 114).

If, when the signal level of the signal received by the new antenna is compared with the signal level preceding the antenna switch (step 104), it is found to be greater than the preceding signal level less the predetermined margin, a different sequence of steps is followed. In this case, the equalizer tap weights are not frozen for the first frame after the antenna switch. Instead, the slot in the first frame is processed in the normal way, in that the equalizer begins with the tap weights stored at the end of the previous slot (before the antenna switch), retrains as far as possible during the slot using the sync word and the subsequent data field, and stores the adapted tap weights at the end of the slot. The data in the slot are demodulated (step 118) and a quality metric evaluated (step 120). If the quality metric is acceptable (greater than the antenna-switching threshold), then the antenna switch is deemed successful (step 122) and reception continues using the new antenna. If, however, the quality metric is not acceptable, the switch controller compares the elapsed time since the antenna switch with a predetermined time termed a forward guard time (step 124). If the forward guard time has not expired, the switch controller allows the receiver to process another slot, including tap weight adaption, demodulation (step 118) and quality metric generation (step 120). The switch controller allows further slots to be demodulated until either the quality metric is acceptable (the quality metric should improve as tap weight adaptation proceeds) or until the forward guard time has expired. If the forward guard time expires before an acceptable quality metric is obtained, the switch controller deems the antenna switch unsuccessful (step 126) and switches back to the old antenna. After switching back, further antenna switching is disabled for a reverse guard time (step 128).

The purpose of the forward guard time is to allow time for the equalizer to adapt to the signal received by the new antenna. Equalizer adaptation may take some time, for example several frames, because of the use of short sync words. The total adaptation time will depend on the amount of adaptation required, which depends on the difference in channel distortion between the old antenna and the new antenna. The forward guard time is therefore set to be equal to, or related to, the maximum expected adaptation time, or convergence time, of the equalizer.

It is important during blind switching that the ability of the receiver to recover data is only lost (a closed-eye pattern) for the shortest time possible, if at all. The forward guard time provides a limit to the time for which data loss is possible (except in the extreme condition in which neither antenna can receive useful data), but the receiver of the embodiment is also controlled so as to reduce as far as possible the probability that a closed-eye pattern is maintained for the whole forward guard time.

After switching antennas, the receiver always decides that the switch has been successful if the quality metric of the demodulated signal from the new antenna is acceptable in the first frame after the switch, whatever the signal level. However, if the quality metric derived from the first slot (or in a small number of frames or slots) after an antenna switch is unacceptable, the receiver only attempts to retrain the equalizer to improve the quality metric if the signal level received by the new antenna is greater than a threshold value. In other words, the receiver only attempts to retrain the equalizer to improve an initially unacceptable quality metric if, on the basis of the signal level, there is a good chance that an acceptable quality metric can be obtained. If, despite an adequate signal level, an acceptable quality metric still cannot be obtained after retraining for the duration of the forward guard time, the receiver deems the antenna switch unsuccessful and switches back to the old antenna. Thus, the receiver is controlled so as to improve the probability of obtaining an acceptable quality metric from the new antenna without letting a closed-eye pattern persist for longer than necessary.

In practice, with a frame length of 5 ms, if the signal level is low after a new antenna is selected and no adequate data can be recovered from the new antenna, data transmission will be interrupted by the blind switch for only one frame, which is 5 ms (or a predetermined small number of frames if a longer interruption is acceptable). In a telephone system an interruption of 5 ms is inaudible. If the signal level is high after a new antenna is selected, then in the worst case the blind switch may cause a service interruption equal to the forward guard time. The forward guard time should be equal to an anticipated maximum retraining time, which may be as long as 10 frames in a system using short sync words. The forward guard time would then be 50 ms. In a telephone system, if the signal is lost, or audio squelched, for 50 ms, typically one syllable of speech is lost. This is audible but if such interruptions are infrequent, then the loss in voice quality is acceptable.

Even if the forward guard time is set to 50 ms, an interruption in the received signal on blind switching may be much less than this if retraining is successful in less than 10 frames. Retraining time depends on the channel distortion of the new antenna but if, as is not uncommon, this is similar to the channel distortion of the old antenna (because both radio channels, or air interfaces, are subject to similar environmental or atmospheric conditions) then retraining may take only 3 frames or less.

The forward guard time can therefore be set according to the maximum length of interruption which is acceptable in any particular system, and the probability of a closed-eye pattern persisting for the whole of the forward guard time. For example, the forward guard time may be between 3 and 20 or more frames, depending on the systems' parameters.

If an antenna switch is made and is unsuccessful, the receiver switches back to the old antenna but further switching is disabled for the duration of the reverse guard time. This is because the initial switch to the new antenna must have been initiated because of a low quality metric derived from the old antenna. Thus, if the switch is unsuccessful and the receiver reverts to the old antenna, the quality metric is likely still to be low. The reverse guard time therefore prevents rapid switching back-and-forth between the antennas and provides a time in which the receiver attempts to retrain the equalizer to improve recovery of data from the signal received by the old antenna.

The reverse guard time also addresses the problem of equalizer "divergence". The equalizer is adapted to the old antenna before an antenna switch and, if the signal level received by the new antenna is sufficient (step 104), it retrains to the new antenna after the switch. However, if an adequate quality metric (step 120) cannot be obtained before the forward guard time expires (step 124) the receiver switches back to the old antenna. The tap weights will then no longer be adapted to the old antenna (the equalizer will have "diverged" from the old antenna) and retraining to the old antenna during the reverse guard time will be required. The extent of the divergence depends on the difference in channel distortion between the antennas.

One way to implement the embodiment described above is to upgrade a non-diversity Nortel Proximity-I receiver. The non-diversity receiver comprises two circuit boards, one carrying RF circuitry and one carrying digital circuitry. The upgrade consists of installing a new RF board, carrying the antenna selector circuitry as well as down-conversion circuitry, and modifying the digital circuit board. The switch controller can be implemented in new software running on the existing Proximity-I digital signal processor. In addition, two or more diversity-receiving antennas must be installed, or at least one antenna added, to replace or to supplement the existing Proximity-I antenna.

Data Coding and the Quality Metric

Data in the transmitted signal is advantageously coded using a known system such as π/4 shifted, differentially encoded quadrature phase shift keying (QPSK), as specified for example in the IS-54 EIA/TIA Cellular System Dual-Mode Mobile Station—Base Station Compatibility Standard. The quality metric is also advantageously evaluated using the method described in this standard, which evaluates the quality metric based on data modulation accuracy by calculating a root-mean-square vector error derived from the sum of the squares of individual vector errors on each of a sequence of recovered data symbols.

Alternatively, the quality metric may be calculated in known manner based on phase error.

The quality metric value reflects the accuracy with which data can be recovered from a received signal. Below a certain quality metric, it is not possible to recover any data. As the quality metric increases, it is possible to recover data with increasing accuracy. The recovery of data is also affected by the use of error correction codes. For example, if the signal quality is such that two data bit errors occur per frame, and the error correction code can correct those two data bit errors, then accurate data can be recovered. Therefore, when the received data includes an error correction code, fully accurate data recovery can be achieved above a corresponding value of the quality metric.

To avoid data loss, the quality metric threshold for switching antennas should therefore be related to the effectiveness of the error correction code being used. For example, the quality metric threshold may be set to correspond to a signal quality between 1 and 2dB better than the signal quality which results in errors in the recovered data after correction using the error correction code.

Thus, if errors are to be avoided, an antenna switch should be made just before the error correction code is overwhelmed by the error rate as signal quality decreases. However, a lower quality metric threshold may be appropriate if a certain error rate is acceptable, for example if it would cause inaudible deterioration in a telephone conversation.

If an adequate quality metric cannot be obtained, it may be necessary to squelch any signal based on the recovered data to avoid receiving an inaccurate signal.

Channel Distortion and Equalizer Training

There are two contributing factors to the received signal quality (the quality metric). These are the delay spread of the channel and signal power (or signal level).

Since the two (or more) antennas of a receiver are not very widely separated, the delay spread of the channels received by each antenna are likely to be similar.

If the delay spread of a channel received by one antenna is low, then the frequency response of that channel is likely to be flat. The delay spread of another antenna after an antenna switch is also likely to be low and the frequency response the second channel is therefore also likely to be flat. Under such circumstances, little tap weight adaption is likely to be necessary after an antenna switch because the required equalizer frequency response is likely to be similar for both channels. Equalizer retraining may then be achieved very rapidly.

By contrast, if the delay spread of one channel is high (greater them about one quarter of the symbol interval), the frequency response of that channel is unlikely to be flat. In addition, the delay spread of a second channel after an antenna switch is then also likely to be high and the frequency response of the second channel is similarly unlikely to be flat. However, under these circumstances the frequency responses of the two channels may be very different and so significant tap weight adaption is likely to be necessary after an antenna switch. Equalizer retraining may then be relatively slow.

Depending on the details of the receiver and the received signal, equalizer retraining is an exponential process having a time constant of about 3 frames. The forward guard time and reverse guard time in the aspects and embodiments of the invention described herein should be adjusted in view of the equalizer retraining characteristics and the channel distortion characteristics of particular implementations of the invention.

Variants of the Method of Operation of the First Preferred Embodiment

Figure 6:
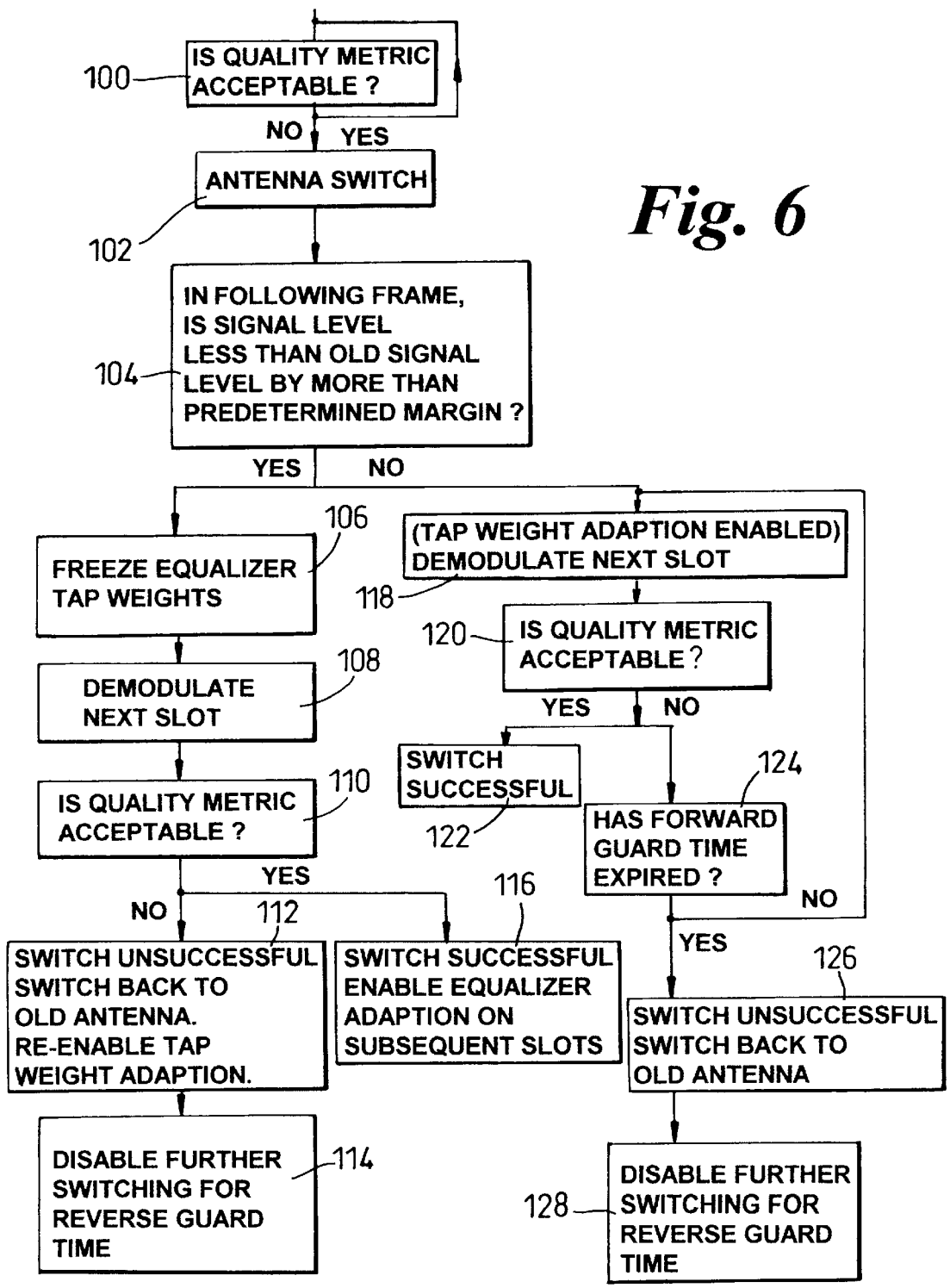
FIG. 6 is a flow diagram showing a first mode of operation of the embodiment of FIG. 5.
Figure 7:
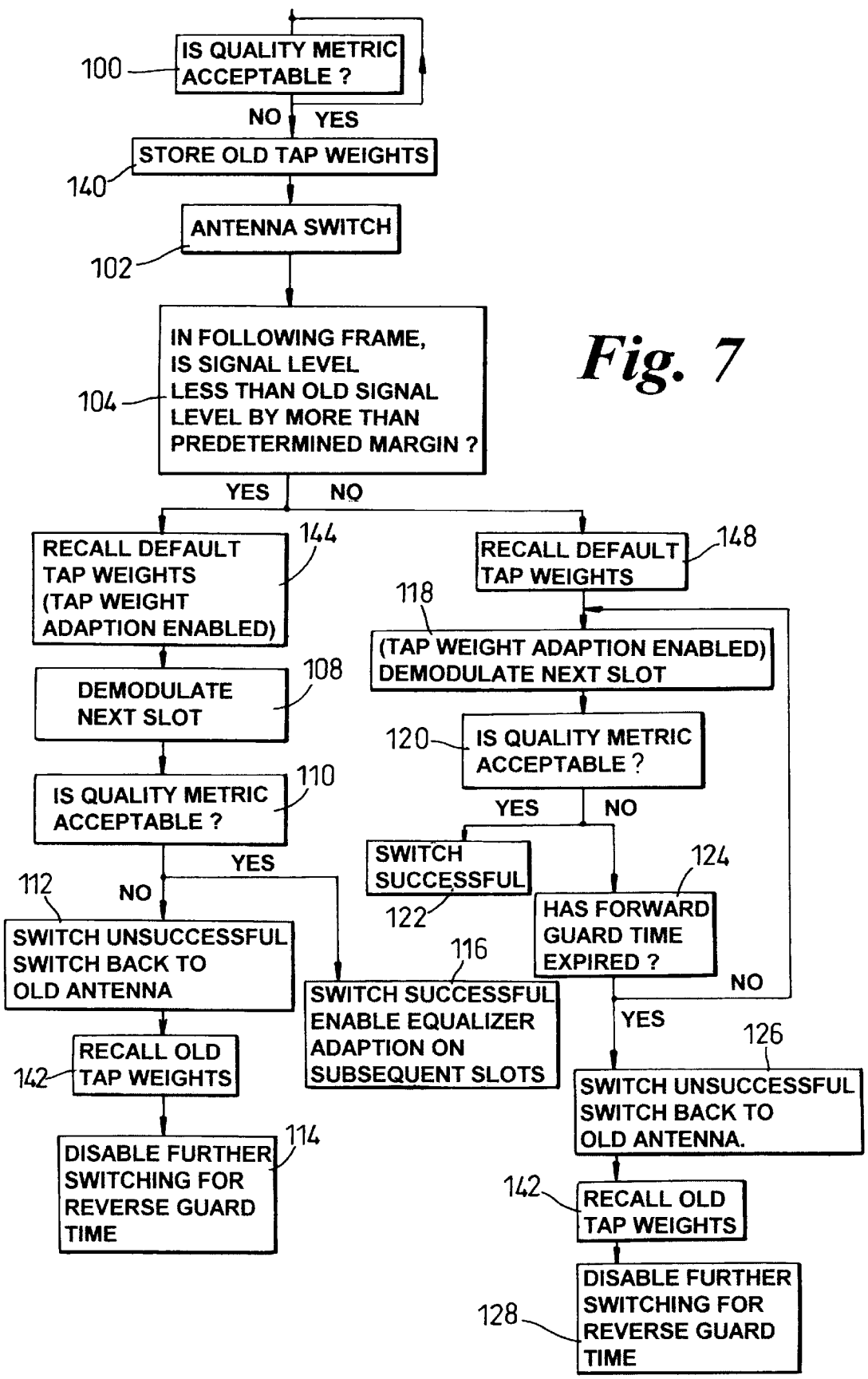
FIG. 7 is a flow diagram showing an alternative mode of operation of the embodiment of FIG. 5.

An alternative means to solve the divergence problem is illustrated in FIG. 7 (in which similar steps are numbered as in FIG. 6). In this embodiment, sufficient memory (RAM)is available to store the tap weights for the old antenna (step 140) before switching (step 102), and to recall and use those tap weights (step 142) if the switch is deemed unsuccessful and it is necessary to switch back to the old antenna (step 126).

When a blind switch is made and the new antenna signal is level is less than the old signal level by more than a predetermined margin (step 104), in the embodiment described above the tap weights are frozen (step 106) while one slot (or a predetermined small number of frames or slots) is demodulated (step 108). This is to avoid equalizer divergence because it is relatively likely when the new signal level is low that a switch back to the old antenna (step 112) will be necessary. However, if sufficient memory is available, it may be advantageous to store the old tap weights (step 140) for use (step 142) if the switch is unsuccessful (step 112), while retraining the equalizer to the new antenna (step 144) in the first frame (or a predetermined small number of frames or slots) after the switch (step 102) even if the signal level from the new antenna is low. Allowing such retraining, may increase the probability of successful data recovery from the new antenna when the new signal level is low.

When a blind switch is made and the new antenna signal level is greater than the old signal level minus a predetermined margin (step 104), it may also be advantageous to store the tap weights for the old antenna just prior to the switch (step 140) and then recall them for use (step 126) if the switch is unsuccessful. This advantageously avoids equalizer divergence.

Whether the signal level after switching antennas is above or below the old signal level less a predetermined margin, a further advantage of storing the old tap weights prior to switching (step 140) may be to allow a free choice of initial tap weights for the new antenna after switching. For example, either the old antenna tap weight values may be used (as shown in FIG. 6) or a set of predetermined default tap weight values (step 144) may be used (as shown in FIG. 7). The default values may be chosen depending on the type of antenna in use (they may be different for each antenna), or on the previous channel characteristics or distortion of an antenna, or on the received signal level.

The initial tap weight values should be chosen to reduce as far as possible the duration of any closed eye pattern after switching and thus to increase as far as possible the chances of early data recovery. This normally means selecting initial tap values to minimize the amount of retraining required. Therefore, preselected default tap values should reflect the expected channel distortion of the new antenna after a switch. However, if in practice the antennas are likely to experience similar channel distortion, it may be better to use the tap weight values of the old antenna prior to the switch as the initial values for the new antenna. FIG. 7 illustrates the use of default tap weights (steps 144 and 148), although the use of the old tap weights could easily be substituted in the figure. In either case, if the switch is unsuccessful and a switch back to the old antenna is made (steps 122 and 126), the old tap weights stored prior to the switch are recalled (steps 142 and 150) for use with the old antenna.

In practice, whether the channel distortion of different antennas is similar depends on a number of factors, such as the types of the antennas (although the antennas must be different, or differently positioned, if diversity is to be achieved), the surroundings of the air interface (e.g. city or country) and statistical issues such as the weather (e.g. windspeed, as the wind acts on trees).

If a switch to a new antenna is successful, and the new antenna remains in use for long enough that when a blind diversity switch back to the "old" antenna is made the channel distortion of the signal received by the "old" antenna is likely to have changed significantly, then a set of default tap weights may advantageously be used to initiate reception by the old antenna rather than the stored old antenna tap weights. This is because the old tap weights are likely to be unsuitable to compensate for the changed channel distortion.

Blind Switching Diversity with more than 2 Antennas

Figure 8:
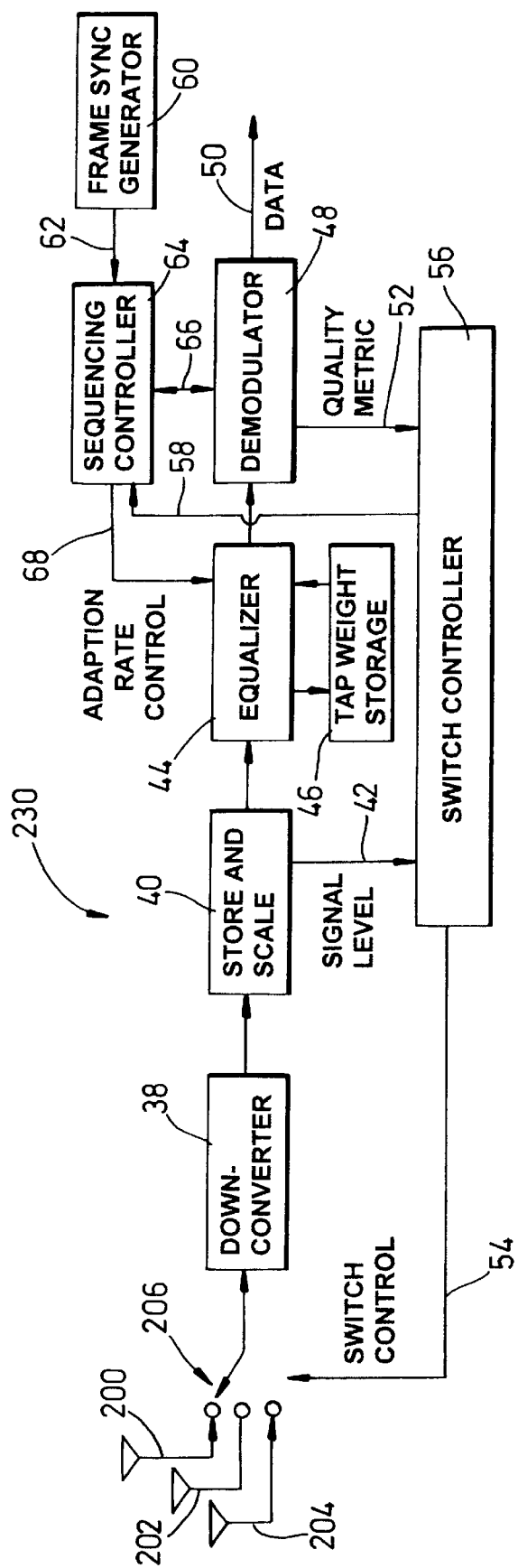
FIG. 8 is a block diagram of a receiver according to a is second embodiment of the invention.

FIG. 8 illustrates a further embodiment of the invention. This embodiment is identical to that of FIG. 5 except that it comprises three diversity antennas 200, 202, 204 connected to inputs of a three-way selector switch 206 in place of the two antennas 32, 34 and the two-way selector switch 36 of FIG. 5. The receiver 230 of FIG. 8 operates similarly to the receivers described above except that when a blind switch is made from a first antenna to a second antenna and is unsuccessful because acceptable data recovery cannot be achieved, a further blind switch to a third antenna may be made rather than switching back to the first antenna. This increases the probability that acceptable data recovery may be achieved by effectively increasing the available diversity of reception.

Any number of diversity antennas may be provided in a similar way to improve diversity reception, although the cost of the receiver would increase as more antennas were provided.

Further Variants of the Embodiments

A blind-switching diversity receiver similar to the embodiments described herein may also advantageously be used at a subscriber unit to improve signal reception. In that case, the timing of antenna switching would be less critical, and antenna switching between slots of a frame would not be required, as the subscriber unit only needs to receive those slots addressed to it. Also, the tap weight store would only need to store tap weights for the slots to be received by that particular subscriber unit.

An antenna switch, as has been described, is made when the quality metric of the signal received by a currently-used antenna falls below a switching threshold. Preferably, however the switch controller should periodically check the signal received by the other antenna or antennas, for example by blind switching to it, measuring the signal level and demodulating, for example, one slot or one frame. If the new antenna provides better data recovery the receiver should switch to it for further reception even though the old antenna provided acceptable reception. This may simply enhance data quality or it may advantageously permit a reduction in the power of the transmitted signal. Transmitted power at both the BTS and subscriber units may be controllable in known manner by signals sent between them depending on the quality of reception at each. Transmission at lower power without reduction in voice (message data) quality may thus advantageously be achieved.

We claim:

1. A receiver for receiving a radio signal carrying digitally-encoded synchronization words and data, comprising:

two or more antennas;

a selector for selecting one of said antennas to receive said radio signal and to provide a received signal;

an equalizer for equalizing said received signal to form an equalized signal;

a demodulator for recovering said data from said equalized signal and for generating a quality metric dependent on the quality of said recovered data; and a controller responsive to said quality metric for controlling said selector;

in which, after said controller controls said selector to select a new one of said antennas in place of a previously-selected one of said antennas, said equalizer uses one or more of said synchronization words to retrain on said received signal from said new antenna and, if said quality metric does not equal or exceed a new-antenna-acceptance quality-metric threshold before a predetermined forward guard time has ended, said controller causes said selector to select another one of said antennas when said forward guard time has ended.

2. A receiver according to claim 1, in which said radio signal is a TDM/TDMA signal comprising a series of frames, each including a plurality of slots for carrying said synchronization words and data.

3. A receiver according to claim 1, in which said forward guard time is related to a maximum expected retraining time of said equalizer.

4. A receiver according to claim 1, in which said selector selects said new antenna if said quality metric derived from said previously-selected antenna falls below a new-antenna-selecting quality-metric threshold.

5. A receiver according to claim 4, in which said new-antenna-selecting quality-metric threshold equals said new-antenna-acceptance quality-metric threshold.

6. A receiver according to claim 1, in which said equalizer retrains progressively using a plurality of synchronization words.

7. A receiver according to claim 2, comprising a signal level detector coupled between said selector and said equalizer for detecting a signal level of said received signal, in which said controller is responsive to said signal level so that, if said signal level is less than a signal-level threshold in a first frame or a predetermined small number of frames after said new antenna is selected, said controller controls said demodulator to recover data from said first frame or said predetermined small number of frames and to generate a quality metric therefrom and, if said quality metric is less than a low-signal-level new-antenna-acceptance quality-metric threshold, said controller controls said selector to select another one of said antennas to receive said radio signal after said first frame or said predetermined small number of frames.

8. A receiver according to claim 7, in which said signal-level threshold is less than a signal level of said received signal prior to said selection of said new antenna, by a predetermined margin.

9. A receiver according to claim 7, in which said low-signal-level, new-antenna-acceptance quality-metric threshold is less than said new-antenna-acceptance quality-metric threshold.

10. A receiver according to claim 7, in which said equalizer is controlled by one or more tap weights which are modified during retraining, and in which said tap weights are frozen during said first frame or said predetermined small number of frames after a new antenna is selected.

11. A receiver according to claim 1, in which said equalizer is controlled by one or more tap weights which are modified during retraining, and in which said tap weights in use prior to said selection of said new antenna are used as initial tap weights after said selection of said new antenna.

12. A receiver according to claim 1, in which said equalizer is controlled by one or more tap weights which are modified during retraining, and in which said tap weights in use prior to said selection of said new antenna are stored in a tap-weight store and a set of one or more predetermined tap weights are used as initial tap weights after said selection of said new antenna.

13. A receiver according to claim 1, in which, if said selection of said new antenna is unsuccessful and it is necessary to revert to said previously-selected antenna, said controller controls said selector to maintain said selection of said previously-selected antenna during a reverse guard time.

14. A receiver according to claim 1, in which said receiver is a fixed wireless access receiver.

15. A receiver according to claim 1, in which said selection of said new antenna enables blind-switching-diversity reception.

16. A receiver according to claim 1, in which said synchronization words are short synchronization words.

17. A method for receiving a radio signal carrying digitally-encoded synchronization words and data, comprising the steps of:
    selecting one of a plurality of antennas for receiving said radio signal and forming a received signal;
    equalizing said received signal to form an equalized signal, said equalization being controlled by one or more tap weights;
    demodulating said equalized signal to recover said data;
    generating a quality metric dependent on the quality of said recovered data; and
    controlling said antenna selection so that after a new one of said antennas is selected in place of a previously-selected one of said antennas, said tap weights are retrained using said synchronization words, and if said quality metric does not equal or exceed a new-antenna-acceptance quality-metric threshold before the end of a forward guard time, another one of said antennas is selected at the end of said forward guard time.

18. A method according to claim 17, in which said tap weights are retrained progressively using a plurality of synchronization words.

19. A method according to claim 17, in which said radio signal is a TDM/TDMA signal comprising a series of frames each including a plurality of slots for carrying said synchronization words and data.

20. A method according to claim 19, further including the step of detecting a signal level of said received signal in a first frame or in a predetermined small number of frames after said selection of said new antenna and, if said signal level is less than a signal-level threshold, selecting another antenna if said quality metric does not exceed a low-signal-level, new-antenna-acceptance quality-metric threshold within said first frame or said predetermined small number of frames.

21. A method according to claim 20, in which said low-signal-level, new-antenna-acceptance quality-metric threshold is less than said new-antenna-acceptance, quality-metric threshold.

22. A method according to claim 20, comprising the step of freezing said tap weights during said first frame or said predetermined small number of frames after said selection of said new antenna.

23. A method according to claim 17, in which said tap weights in use prior to said selection of said new antenna are used as initial tap weights after said selection of said new antenna.

24. A method according to claim 17, comprising the steps of storing said tap weights in use prior to said selection of said new antenna and using a set of one or more predetermined tap weights as initial tap weights after said selection of said new antenna.

25. A method according to claim 17, in which, if said selection of said new antenna is unsuccessful and said previously-connected antenna is reselected, said reselection of said previously-connected antenna is maintained during a reverse guard time.

26. A method according to claim 17, implemented in a fixed wireless access receiver.

27. A method according to claim 17, for implementing blind-switching-diversity reception.

28. A method according to claim 17, further including the step of detecting a signal level of said received signal after said selection of said new antenna and varying said forward guard time depending on said signal level.

29. A receiver for receiving a radio signal carrying digitally-encoded synchronization words and data, comprising:
    two or more antennas;
    a selector for selecting one of said antennas to receive said radio signal and to provide a received signal;
    a signal level detector for detecting a signal level of said received signal;
    an equalizer for equalizing said received signal to form an equalized signal;
    a demodulator for recovering said data from said equalized signal and for generating a quality metric dependent on the quality of said recovered data; and
    a controller responsive to said quality metric for controlling said selector;
    in which, after said controller controls said selector to select a new one of said antennas in place of a previously-selected one of said antennas, if said signal level is less than a signal-level threshold then said demodulator recovers data from said equalized signal for a predetermined short time and generates a quality metric therefrom, and if said quality metric is less than a low-signal-level, new-antenna-acceptance quality-metric threshold, then said controller controls said selector to select another one of said antennas to receive said radio signal after said predetermined short time.

30. A receiver according to claim 29, in which if said signal level after said selection of said new antenna is greater than said signal-level threshold, then said selection of said new antenna is maintained while said equalizer retrains using said synchronization words until either said quality metric derived from said recovered data exceeds a new-antenna-acceptance quality-metric threshold, in which case said new antenna selection is successful, or a forward guard time expires, in which case said controller controls said selector to select another one of said antennas.

31. A receiver according to claim 30, in which said forward guard time is equal to an anticipated maximum equalizer retraining time.

32. A receiver according to claim 30, in which said forward guard time is varied depending on said signal level.

33. A receiver according to claim 29, in which said equalizer is controlled by one or more tap weights and said tap weights prior to said new antenna selection are used as initial tap weights after said new antenna selection.

34. A receiver according to claim 29, in which said equalizer is controlled by one or more tap weights and one or more predetermined tap weights are used as initial tap weights after said new antenna selection.

35. A receiver according to claim 30, in which said equalizer is controlled by one or more tap weights, said tap weights being retrained using each synchronization word, and in which said tap weights are frozen and said retraining disabled during said predetermined short time after said new antenna selection if said signal level is less than said signal-level threshold.

36. A receiver according to claim 29, in which said radio signal comprises a series of frames, each including a plurality of slots for carrying digitally encoded synchronization words and data, and in which said predetermined short time corresponds to a predetermined small number of frames.

37. A method for receiving a radio signal carrying digitally-encoded synchronization words and data, comprising the steps of:

selecting one of a plurality of antennas for receiving said radio signal and forming a received signal;

detecting a signal level of said received signal;

equalizing said received signal to form an equalized signal, said equalization being controlled by one or more tap weights;

demodulating said equalized signal to recover said data;

generating a quality metric dependent on the quality of said recovered data; and controlling said antenna selection so that after a new one of said antennas is selected in place of a previously-selected one of said antennas, if said signal level is less than a signal-level threshold and if said quality metric derived from said recovered data during a predetermined short time after said new antenna selection is less than a low-signal-level, new-antenna-acceptance quality-metric threshold, then another one of said antennas is selected to receive said radio signal after said predetermined short time.

38. A method according to claim 37, in which, if said signal level after new antenna selection is greater than said signal-level threshold, said selection of said new antenna is maintained while said tap weights are retrained using said synchronization words until either said quality metric exceeds a new-antenna-acceptance quality-metric threshold, in which case said new antenna selection is successful, or a predetermined forward guard time expires, in which case another one of said antennas is selected.

39. A method according to claim 38, in which said predetermined forward guard time is equal to an expected maximum equalizer retraining time.

40. A method according to claim 38, in which said predetermined forward guard time is varied depending on said signal level.

41. A method according to claim 37, in which said tap weights prior to said new antenna selection are used as initial tap weights after said new antenna selection.

42. A method according to claim 37, in which one or more default tap weights are used as initial tap weights after said new antenna selection and said tap weights prior to said new antenna selection are stored for use if said new antenna selection is unsuccessful and said previously-selected antenna is reselected.

43. A method according to claim 37, in which retraining of said tap weights using said synchronization words is disabled during said predetermined short time.

44. A method according to claim 37, in which said radio signal comprises a series of frames, each including a plurality of slots for carrying digitally encoded synchronization words and data, and in which said predetermined short time corresponds to a predetermined small number of frames.

45. An apparatus for upgrading a receiver for receiving a radio signal carrying digitally-encoded synchronization words and data, to implement blind-switching-diversity reception, said receiver comprising an antenna for receiving said radio signal, an equalizer for equalizing said received signal and a demodulator for recovering said data, and said apparatus comprising:

antenna means including one or more additional antennas or two or more replacement antennas;

a selector for selecting one of said antennas to receive said radio signal and to provide said received signal;

a means for generating a quality metric dependent on the quality of said recovered data; and a controller responsive to said quality metric for controlling said selector;

in which, after said controller controls said selector to select a new one of said antennas in place of a previously-selected one of said antennas, said equalizer uses one or more of said synchronization words to retrain on said received signal from said new antenna and, if said quality metric does not equal or exceed a new-antenna-acceptance quality-metric threshold before a predetermined forward guard time has ended, said controller causes said selector to select another one of said antennas when said predetermined forward guard time has ended.

46. An apparatus for upgrading a receiver for receiving a radio signal carrying digitally-encoded synchronization words and data, to implement blind-switching-diversity reception, said receiver comprising an antenna for receiving said radio signal, an equalizer for equalizing said received signal and a demodulator for recovering said data, and said apparatus comprising:

antenna means including one or more additional antennas or two or more replacement antennas;

a selector for selecting one of said antennas to receive said radio signal and to provide said received signal;

a signal level detector for detecting a signal level of said received signal;

a means for generating a quality metric dependent on the quality of said recovered data; and a controller responsive to said quality metric for controlling said selector;

in which, after said controller controls said selector to select a new one of said antennas in place of a previously-selected one of said antennas, if said signal level is less than a signal-level threshold in a predetermined short time after said new antenna is selected, said demodulator recovers data during said predetermined short time and generates a quality metric therefrom, and if said quality metric is less than a low-signal-level, new-antenna-acceptance quality-metric threshold, then said controller controls said selector to select another one of said antennas to receive said radio signal after said predetermined short time.

\* \* \* \* \*